(12) United States Patent
Stefani et al.

(10) Patent No.: US 11,618,193 B2
(45) Date of Patent: Apr. 4, 2023

(54) PROCESS FOR MAKING AN OBJECT FROM PLASTIC MATERIAL AND OBJECT MADE OF PLASTIC MATERIAL MADE WITH SUCH PROCESS

(71) Applicant: STEFANPLAST S.P.A., Villaganzerla di Castegnero (IT)

(72) Inventors: Walter Stefani, Castegnero (IT); Nicola Stefani, Castegnero (IT); Luciano Ghiotto, Camisano Vicentino (IT)

(73) Assignee: Stefanplast S.P.A., Villaganzerla di Castegnero (IT)

( * ) Notice: Subject to any disclaimer, the term of this patent is extended or adjusted under 35 U.S.C. 154(b) by 58 days.

(21) Appl. No.: 17/056,373

(22) PCT Filed: Jun. 19, 2019

(86) PCT No.: PCT/IB2019/055175
§ 371 (c)(1),
(2) Date: Nov. 17, 2020

(87) PCT Pub. No.: WO2019/244079
PCT Pub. Date: Dec. 26, 2019

(65) Prior Publication Data
US 2021/0206039 A1    Jul. 8, 2021

(30) Foreign Application Priority Data

Jun. 20, 2018   (IT) ................ 102018000006491

(51) Int. Cl.
*B29C 45/16*   (2006.01)
*B29C 45/17*   (2006.01)
(Continued)

(52) U.S. Cl.
CPC .......... *B29C 45/16* (2013.01); *B29C 45/1769* (2013.01); *B29C 45/26* (2013.01);
(Continued)

(58) Field of Classification Search
CPC ..... B29C 45/16; B29C 45/1769; B29C 45/26; B29K 2995/0021; B29L 2031/7136
(Continued)

(56) References Cited

U.S. PATENT DOCUMENTS

| 5,868,824 A | 2/1999 | Andersen et al. |
| 2005/0146073 A1 | 7/2005 | Guloy |
| 2016/0023504 A1 | 1/2016 | Shapiro |

FOREIGN PATENT DOCUMENTS

| DE | 10 2004 060876 A1 | 6/2006 |
| JP | 2001-088883 A | 4/2001 |
| JP | 2002-361680 A | 12/2002 |

OTHER PUBLICATIONS

International Search Report and Written Opinion dated Sep. 27, 2019, issued in PCT Application No. PCT/IB2019/055175, filed Jun. 19, 2019.

*Primary Examiner* — Jeffrey M Wollschlager
*Assistant Examiner* — Xue H Liu
(74) *Attorney, Agent, or Firm* — Workman Nydegger (57) ABSTRACT

A process for making an object from plastic material includes the following operations: moulding at least one insert, injecting a first plastic material into a first moulding cast, such first cast being configured so that the at least one insert includes a base from which exposure reliefs extend, intended to be visible when the object made of plastic material is finished, between the exposure reliefs passage channels being defined for a second plastic material in a subsequent overmoulding operation; positioning the insert in a second moulding cast, so that the insert is positioned with the base pressed against a first surface of a first half-mould of the second cast, and with the exposure reliefs pressed against an opposite second surface of a second half-mould; overmoulding a second plastic material on a part of the insert, injecting the second plastic material into
(Continued)

the second cast, so that the second plastic material injected fills the second cast passing through the passage channels defined between the exposure reliefs of the insert, covering the base and being interposed between the exposure reliefs.

7 Claims, 7 Drawing Sheets (51) Int. Cl.
  *B29C 45/26* (2006.01)
  *A47G 7/06* (2006.01)
  *B29L 31/00* (2006.01)
(52) U.S. Cl.
  CPC ........ *A47G 7/06* (2013.01); *B29K 2995/0021* (2013.01); *B29L 2031/7136* (2013.01)
(58) Field of Classification Search
  USPC .......................................................... 264/259
  See application file for complete search history.

PROCESS FOR MAKING AN OBJECT FROM PLASTIC MATERIAL AND OBJECT MADE OF PLASTIC MATERIAL MADE WITH SUCH PROCESS

BACKGROUND OF THE INVENTION

1. The Field of the Invention

The invention relates to a process for making an object from plastic material and an object made of plastic material made with such process.

2. The Relevant Technology

Nowadays, to make an object from plastic material comprising a plurality of different coloured portions, the operations are as follows:
  moulding with a first plastic material of a first colour, in a first moulding cast, a first portion of a multi-coloured object to be made, so that such first portion has raised areas, intended to be visible on the finished object, and concave areas, between said raised areas, adapted to house a second plastic material of a second colour, and through openings adapted to allow the passage of such second plastic material towards said concave areas,
  moving such first portion from the first cast to a second moulding cast, in which second cast the concave areas face a surface of a half-mould, whereas the surrounding raised areas are pressed against the same surface of a half-mould,
  moulding with the second plastic material of the second colour the second portion of the multicoloured object, so that such second plastic material on one hand coats the first portion, then transiting through the through openings until it fills the concave areas facing a surface of a half-mould.

Such multicoloured objects, once finished, have an outer surface of various colours, e.g., two colours as exemplified above, a first colour of the raised areas, made with the first plastic material, and a second colour of the concave areas filled with the plastic material of a second colour.

Such objects made of plastic material, although of many colours, have a substantially smooth outer surface, as the second plastic material fully invades the space defined by a concave area and by the surface of the half-mould that closes it, and takes the smooth shape of the same surface of the half-mould.

To obtain objects made of multicoloured plastic material that also have an outer surface with reliefs or bas-reliefs it is necessary to equip the mould with complex undercuts and corresponding movement systems, that make the cost of the moulding equipment and therefore the cost of the product increase.

SUMMARY OF THE INVENTION

The task of the present invention is to develop a process for the realisation of an object made of plastic material that can overcome the mentioned drawbacks and limits of the prior art.

In particular, an aim of the invention is that of developing a process that can be performed without having to resort to complex and expensive moulds.

Another aim of the invention is that of developing an object made of plastic material with the process according to the main task.

Another aim of the invention is that of developing an apparatus for performing a process according to the main task.

The task and the other aims mentioned above are reached by a process for making an object from plastic material, according to claim 1, and an apparatus according to the claims.

Further characteristics of the process according to claim 1 are described in the dependent claims.

BRIEF DESCRIPTION OF THE DRAWINGS

The aforesaid task and objects, together with the advantages that will be mentioned hereinafter, are indicated by the description of an embodiment of the invention, which is given by way of non-limiting example with reference to the attached drawings, where.

DETAILED DESCRIPTION OF THE PREFERRED EMBODIMENTS

Figure 1:
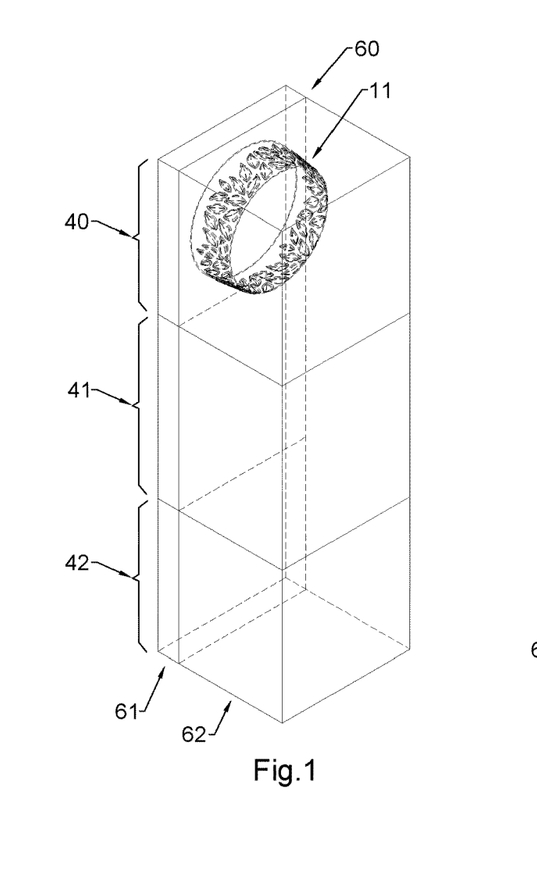
FIG. 1 schematically represents a first step of a process according to the invention.
Figure 2:
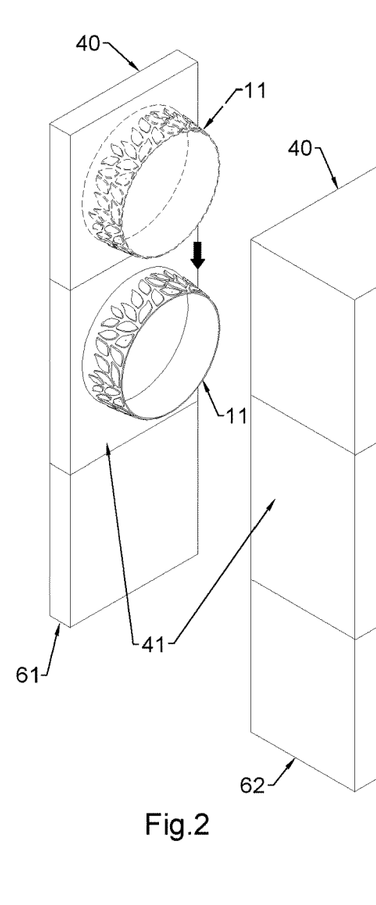
FIG. 2 schematically represents a second step of a process according to the invention.

With reference to the cited figures, a process for making an object from a plastic material 10 according to the invention comprises the following operations:
  moulding an insert 11, by injecting a first plastic material into a first moulding cast; such first operation is exemplified schematically in FIG. 1, where an insert is indicated by 11, while 40 depicts a first mould inside which such first cast is defined for making the insert 11; the first cast is configured so that the insert 11 comprises a base 12 from which exposure reliefs 13, 13a, 13b, 13c extend, intended to be visible when the object made of plastic material is finished; between the exposure reliefs 13, 13a, 13b, 13c passage channels 14, 14a, 14b, 14c are defined for the passage of a second plastic material in a subsequent overmoulding operation;

positioning the insert 11 in a second moulding cast, so that the insert 11 is positioned with the base 12 pressed against a first surface 17 of a first half-mould 18 of the second cast, and with exposure reliefs 13, 13a, 13b pressed against an opposite second surface 19 of a second half-mould 20; such second operation is schematically exemplified in FIG. 2, where 41 depicts a second mould inside which such second cast is defined;

overmoulding a second plastic material onto a part of the insert 11, injecting such second plastic material into the second cast, so that the second plastic material injected fills the second cast passing through the passage channels 14, 14a, 14b, 14c defined between the exposure reliefs 13, 13a, 13b, 13c of the insert 11, covering said base 12 and being interposed between said exposure reliefs 13, 13a, 13b, 13c.

The passage channels 14, 14a, 14b, 14c are considered to be defined between the exposure reliefs 13, 13a, 13b, 13c and the second surface 19 of the second half-mould 20.

Figure 3:
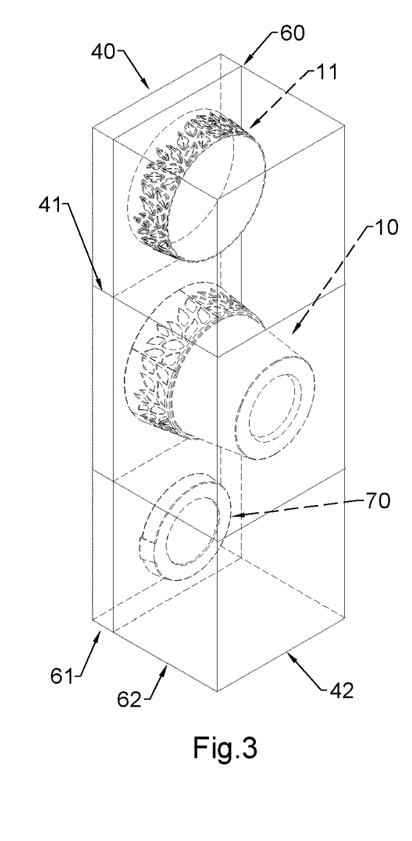
FIG. 3 represents a third step of a process according to the invention.
Figure 4:
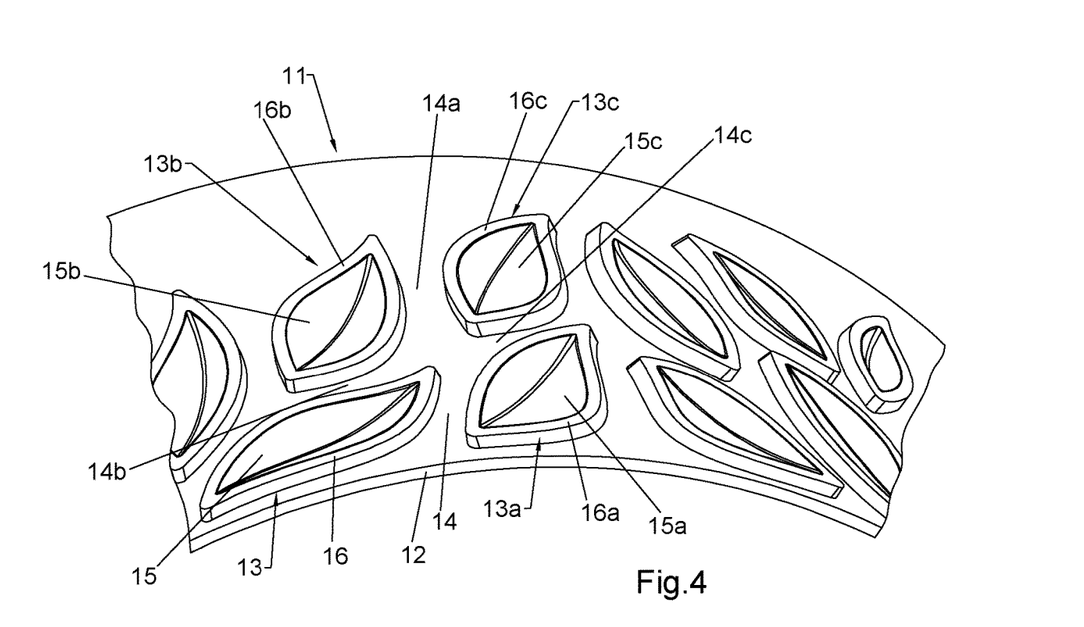
FIG. 4 represents a portion of a first colour made with the first step of the process according to the invention.

The third operation of overmoulding the second plastic material on a part of the insert 11 is schematically exemplified in FIG. 3, where in the second cast, inside the second mould 41, the two-colour plastic material object 10 is shown.

In the non-limiting embodiment of the invention, the exposure reliefs 13, 13a, 13b, 13c have a hollow 15, 15a, 15b, 15c, respectively surrounded by a perimeter sealing edge 16, 16a, 16b, 16c, respectively configured to prevent the entry of the second plastic material into the respective hollow 15, 15a, 15b, 15c during a subsequent overmoulding operation.

Hollows and sealing edges are clearly visible in FIGS. 4 to 8.

The operation of positioning the insert 11 in the second moulding cast envisages that the insert 11 is positioned with the base 12 pressed against a first surface 17 of a first half-mould 18 of the second cast, and with the sealing edges 16, 16a, 16b, 16c of the exposure reliefs 13, 13a, 13b, 13c pressed against an opposite second surface 19 of a second half-mould 20; such second operation is schematically exemplified in FIG. 2, where 41 depicts a second mould inside which such second cast is defined.

The injection of the second plastic material into the second cast takes place so that the second plastic material injected fills the second cast passing through the passage channels 14, 14a, 14b, 14c defined between the exposure reliefs 13, 13a, 13b, 13c of the insert 11, without entering the hollows 15, 15a, 15b, 15c of the exposure reliefs 13, 13a, 13b, 13c.

Below, A indicates a first plastic material of a first colour and B indicates a second plastic material of a second colour.

Figure 6:
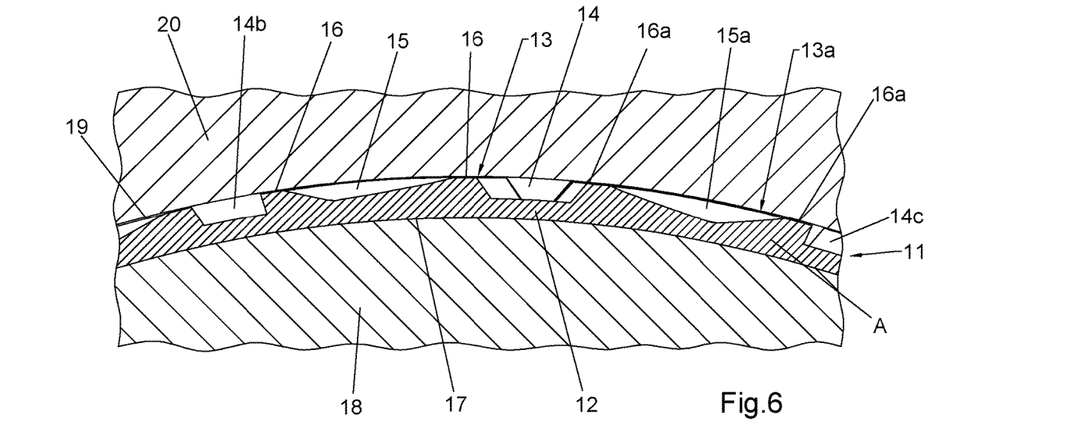
FIG. 6 represents a cross sectional view of a detail of the portion of a first colour inserted in a cast for the moulding of another portion of a second colour, according to the second step of the process of the invention.

FIG. 6 represents, according to a cross section to its main axis of symmetry, the insert 11, made in the first operation with the first plastic material A, pressed between the two half-moulds 18 and 20 as per the second operation of the process according to the invention, with the spaces defined by the passage channels 14, 14a still free from the second plastic material B.

Figure 7:
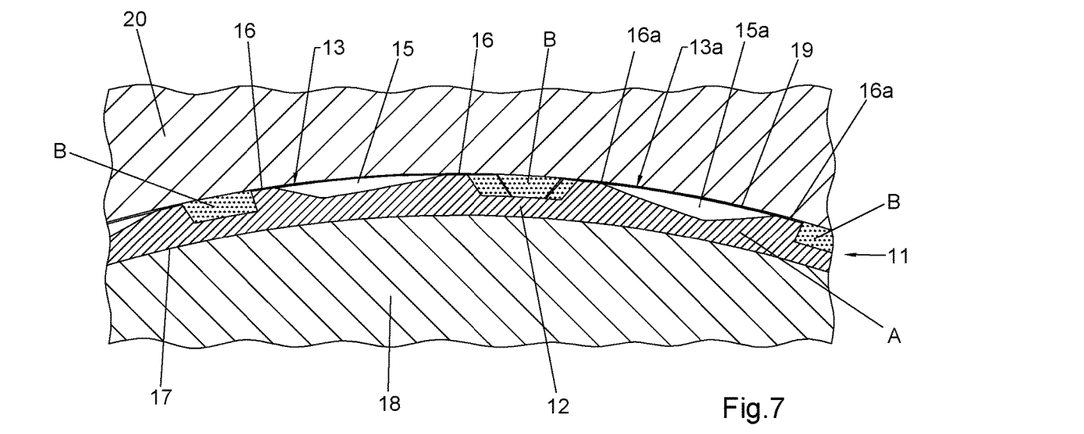
FIG. 7 represents the same detail of FIG. 6 in the third step of the process according to the invention.
Figure 8:
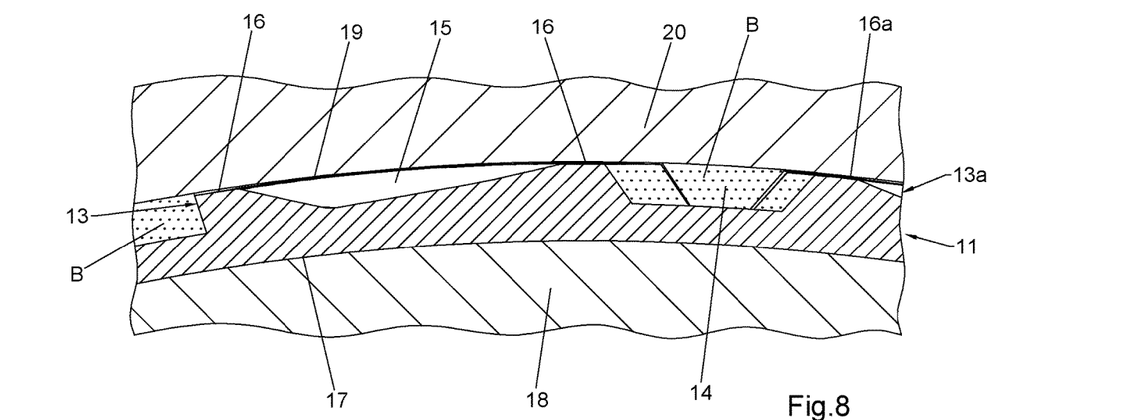
FIG. 8 represents a detail of FIG. 7.

FIGS. 7 and 8 exemplify the third operation of the process according to the invention, i.e., the injection of the second plastic material B, which fills the passage channels 14, 14a but not the hollows 15, 15a, thanks to the sealing effect exercised by the sealing edges 16, 16a against the second surface 19 of the second half-mould 20.

Figure 9:
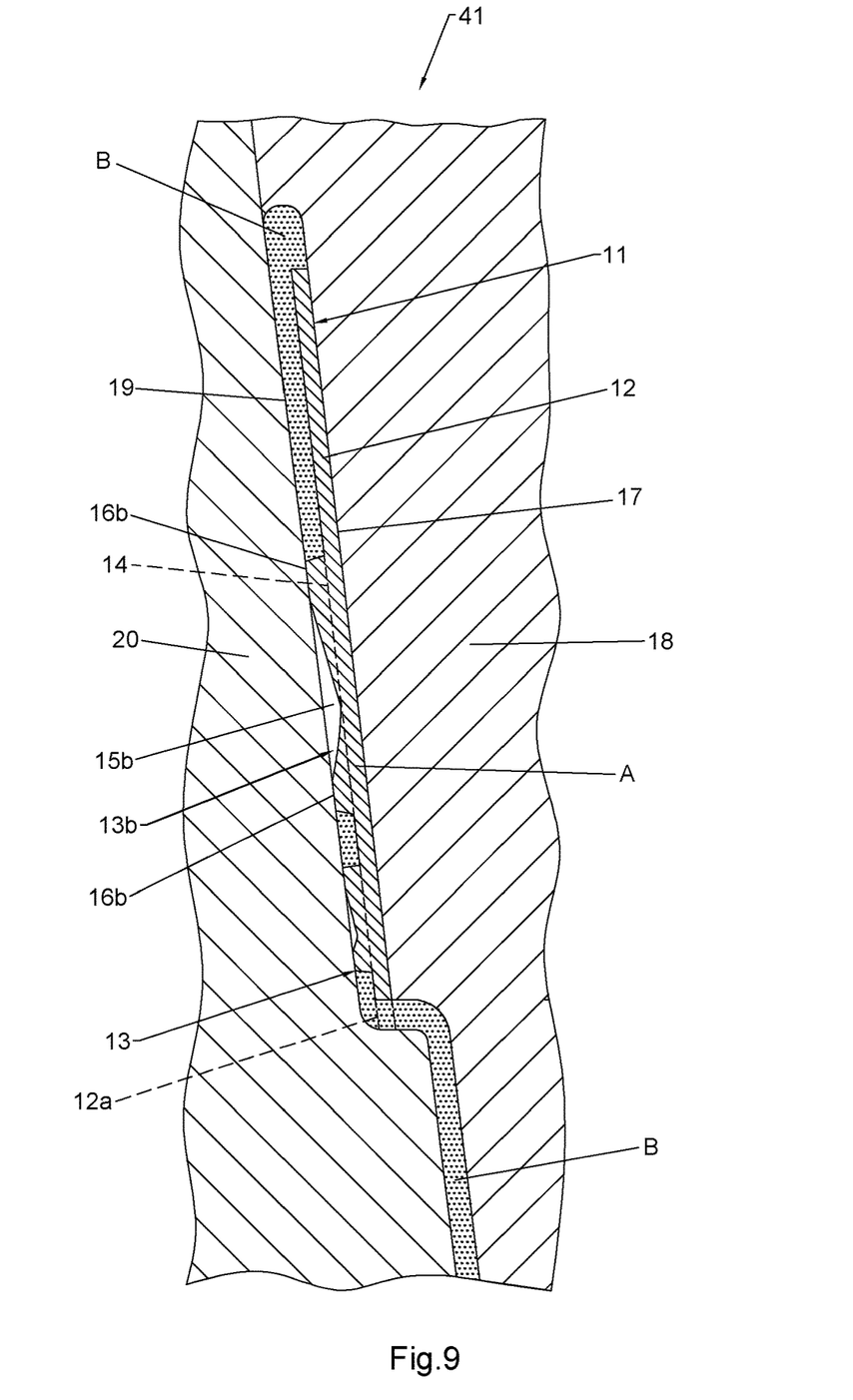
FIG. 9 represents another sectional view of a portion of a first colour overmoulded with another portion of a second colour.

FIG. 9 represents a section of the insert 11 defined according to a plane that comprises the main axis of symmetry of the insert 11 itself.

Such FIG. 9 represents the third operation of the process according to the invention, in which the second plastic material B is injected into the second cast of the second mould 41, so as to cover the base 12 of the insert 11, made of the first plastic material A, and to be arranged between the exposure reliefs 13, without invading the hollows 15 of the same exposure reliefs 13.

The base 12 can have resting reliefs 12a, indicated with broken lines in the same FIG. 9, which are made on a perimeter edge of the base 12.

Such resting reliefs 12a are positioned spaced out along the perimeter edge, so as to define a "comb-like" shape, so that the second plastic material B passes between them.

Such resting reliefs 12a allow the base 12 to rest upon the surface 19a of a shoulder 20a defined in the second half-mould 20.

The fact that the base 12 rests through the resting reliefs 12a on an inner zone, i.e., on the shoulder 20a, of the second half-mould 20, guarantees the correct positioning and the correct sealing coupling, of the base 12 of the insert 11 with the first half-mould 18.

Figure 10:
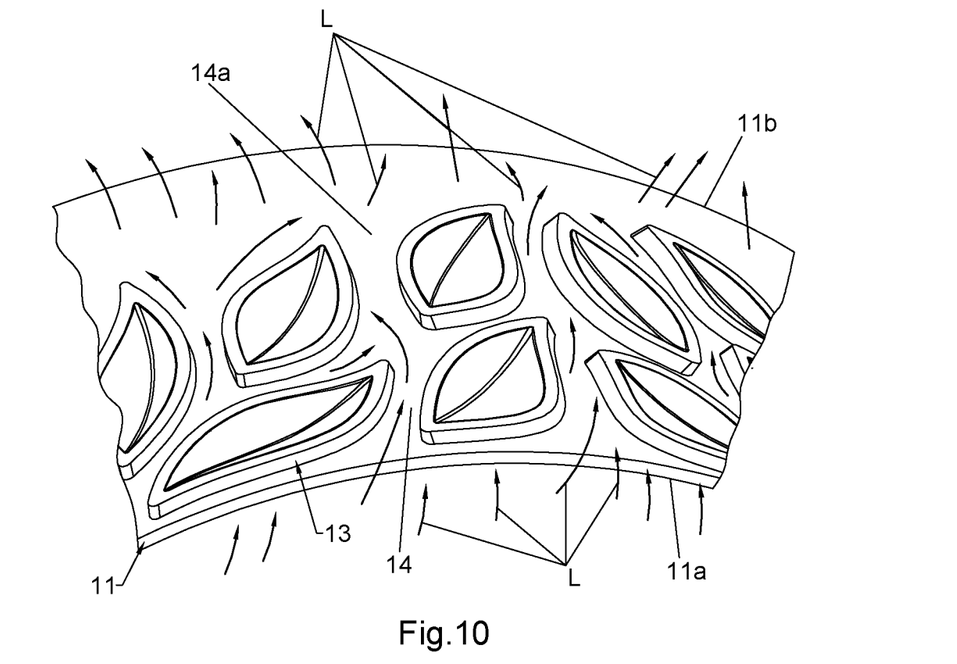
FIG. 10 represents the same view as FIG. 4 indicating the passage lines for a plastic material of a second colour.

FIG. 10 depicts the passage lines L of the second plastic material B in the passage channels 14, 14a, 14b, 14c defined between the exposure reliefs 13, 13a, 13b, 13c.

The passage channels 14, 14a, 14b, 14c are made so as to allow the passage of the second plastic material B from a first side 11a to a second opposite side 11b of the insert 11.

Figure 5:
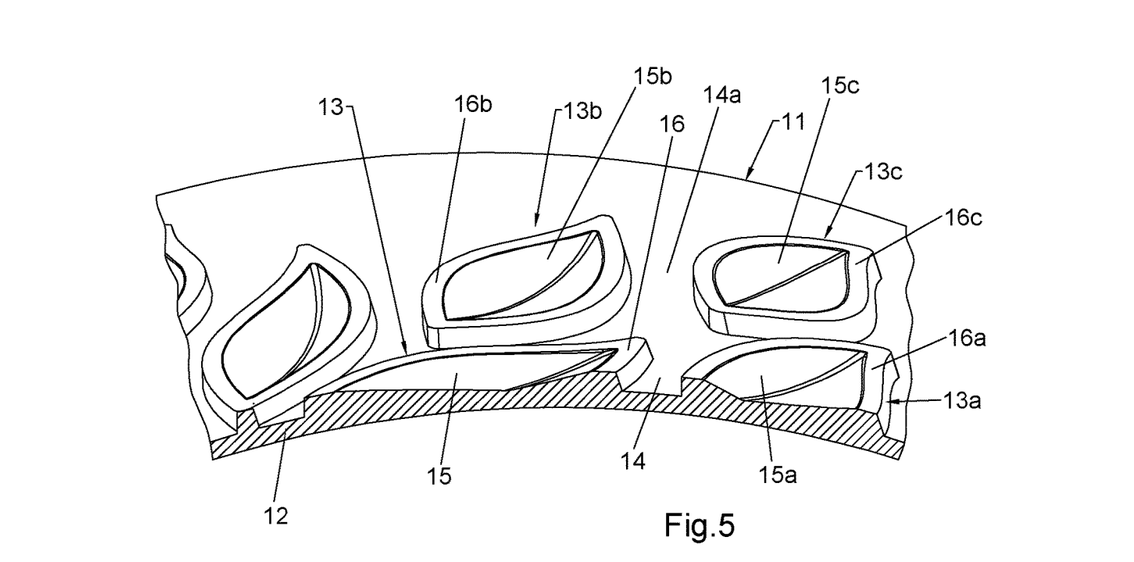
FIG. 5 represents a perspective section of the portion of a first colour of FIG. 4.
Figure 11:
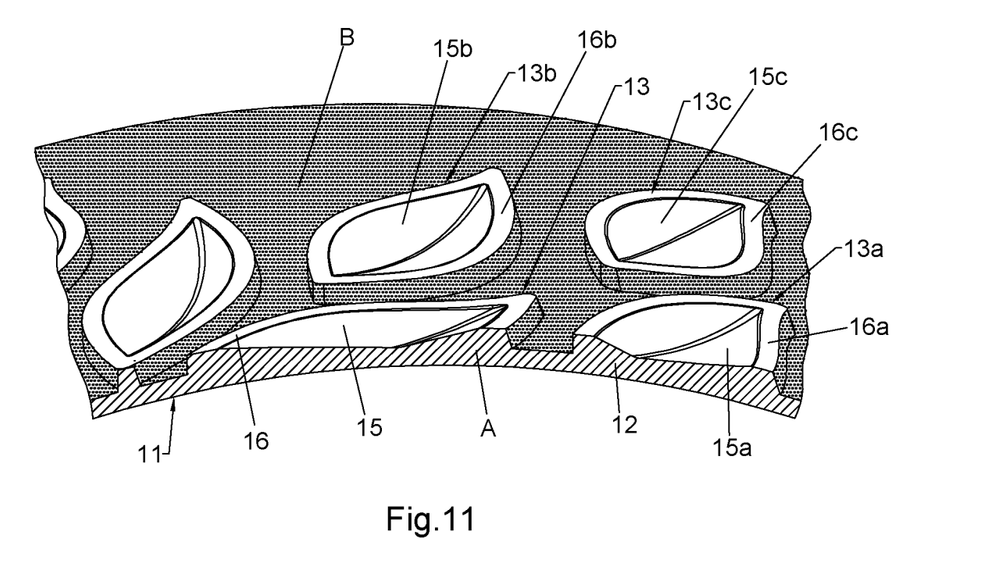
FIG. 11 represents the same view as FIG. 5 with the portion of a first colour partially covered by another portion of a second colour.

FIG. 11 represents the same perspective sectional view of FIG. 5, highlighting how the base 12 is covered by the second plastic material B and only the sealing edges 16, 16a, 16b, 16c of the exposure reliefs 13, 13a, 13b, 13c remain free, together with the hollows 15, 15a, 15b, 15c that are surrounded by such sealing edges 16, 16a, 16b, 16c.

Thanks to a similar process according to the invention, it is possible to make an object from plastic material 10, e.g., a vase, in which the outer surface is made of various colours.

The present process according to the invention also allows an object to be made of plastic material 10 wherein the outer surface has one or more hollows 15, which hollows are defined without resorting to any moulding apparatuses that comprise complex movable undercuts.

In the present embodiment of the invention, the process according to the invention is used for making an object from plastic material comprising a vase made of plastic material 10.

Figure 12:
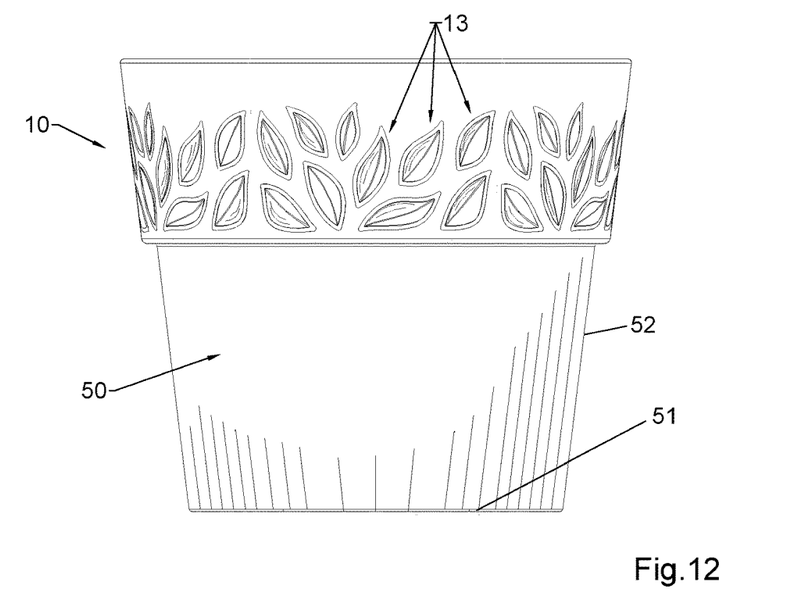
FIG. 12 represents a side view of an object made of a plastic material with a process according to the invention.
Figure 13:
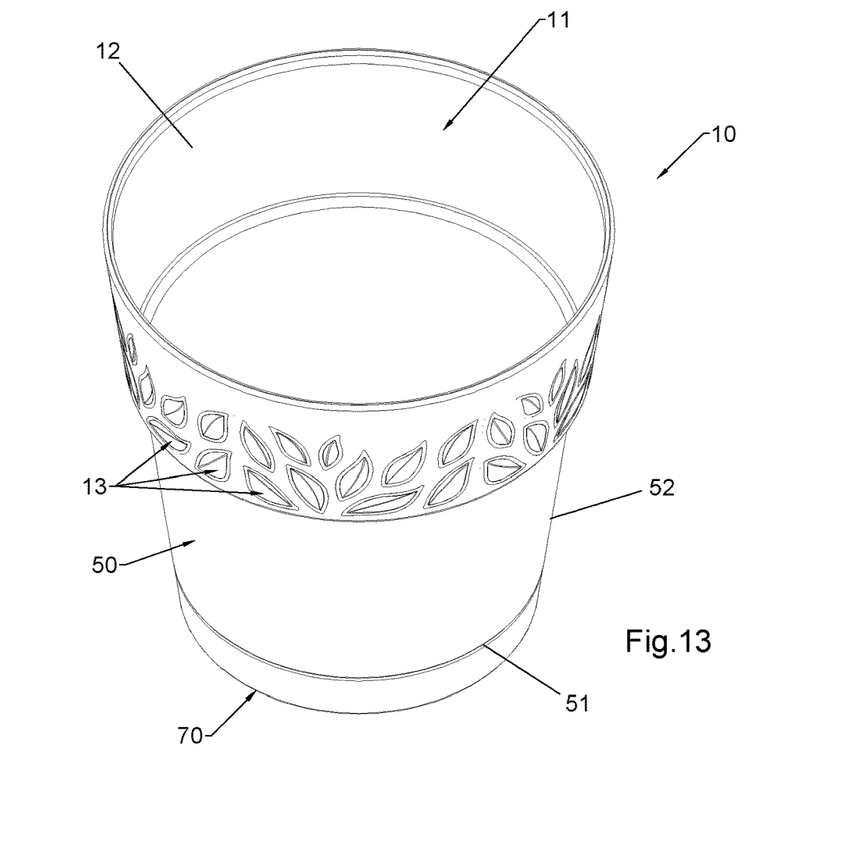
FIG. 13 represents a perspective view of the object of FIG. 12.

Such vase 10 is clearly represented in FIGS. 12 and 13.

Such vase 10 comprises an insert 11 having an annular base 12 with exposure reliefs 13.

The insert 11 is incorporated into a hollow body 50, e.g., truncated cone shaped, comprising a bottom 51 and a side wall 52 that extends upwards, with respect to a use configuration of the vase 10, starting from the whole perimeter of the bottom 51.

Figure 14:
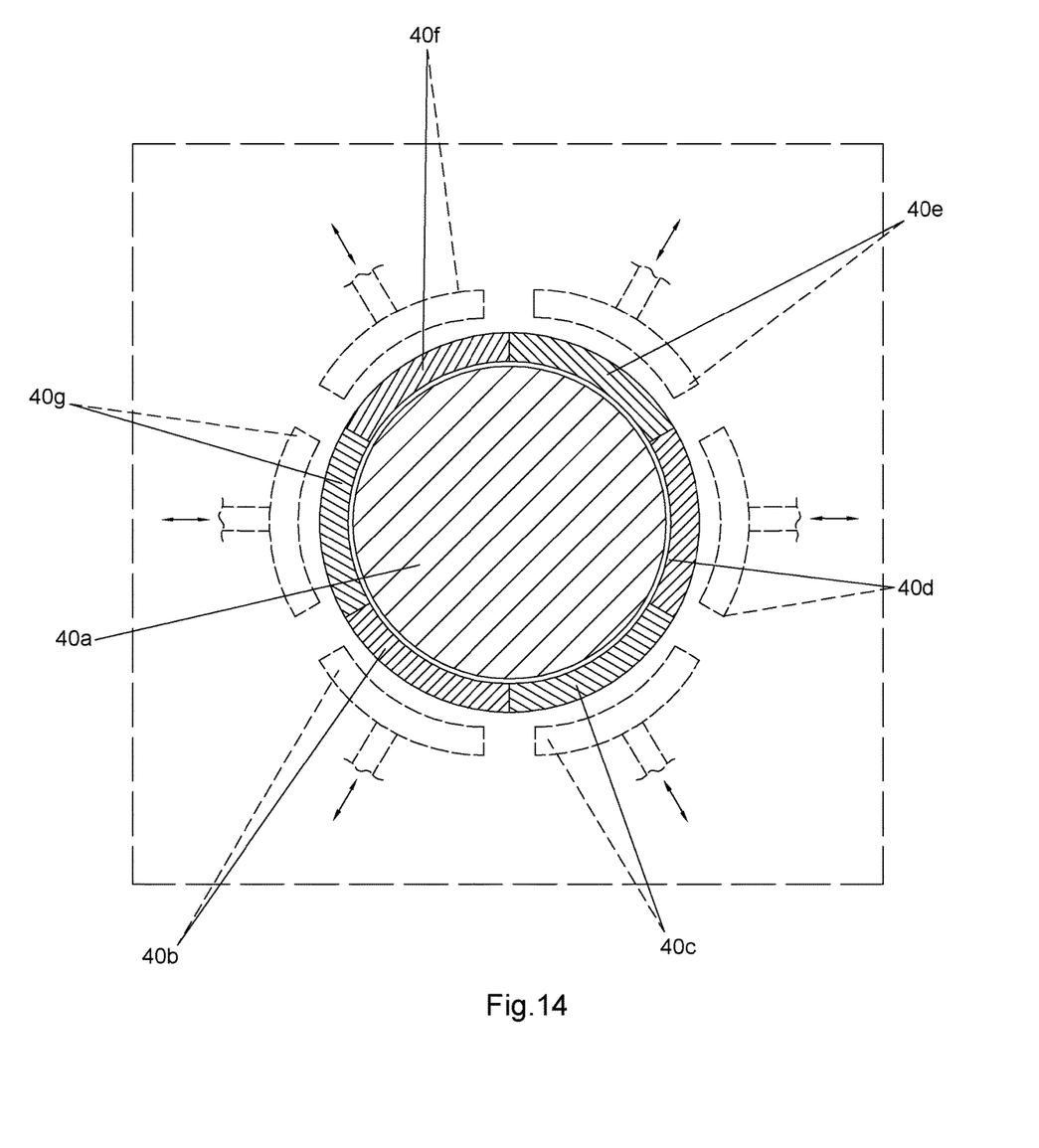
FIG. 14 represents a schematic plan view of a moulding apparatus for performing a process according to the invention.

An object of the invention is also an apparatus 60 for making a similar vase 10 through a process according to the invention.

Such apparatus 60 comprises:

a first mould 40 inside which a first cast is defined for making an insert 11 comprising an annular base 12 and exposure reliefs 13, a second mould 41 inside which a second cast is defined for making a hollow body 50 comprising a bottom 51 and a side wall 52 that extends upwards, with respect to a use configuration of the vase 10, starting from the whole perimeter of the bottom 51, said second mould comprising a first inner half-mould 18 and a second outer half-mould 20, configured to be coupled with said insert 11 so that the insert 11 is positioned with the base 12 pressed against a first surface 17 of the first half-mould 18, and with exposure reliefs 13 pressed against an opposite second surface 19 of the second half-mould 20;

automatic means for the extraction of said insert 11 from said first mould 40 and the insertion of the same insert 11 into the second mould 41.

The apparatus 60 can comprise a third mould 42 for making a saucer 70, as depicted in FIG. 3.

In particular, the apparatus 60 can comprise two single blocks 61 and 62 on each of which three half-moulds of the three moulds 40, 41 and 42 are defined.

With a similar apparatus 60, at every closure of the two blocks 61 and 62 an insert 11, a vase 10 and a saucer 70 are made simultaneously, thus optimising production times.

At the opening of the two blocks 61 and 62 a vase 10 and a saucer 70 are extracted and an insert 11 is moved from the first mould 40 to the second mould 42.

In particular, the first mould 40 defining the first cast for making the annular insert 11 comprises an inner half-mould 40a, and a plurality of outer movable jaws 40b, 40c, 40d, 40e, 40f, 40g, moved in the radial direction by corresponding movement means, configured to define the base 12 and the exposure reliefs 13.

When the outer movable jaws 40b, 40c, 40d, 40e, 40f, 40g are in the advanced configuration they define an outer annular wall that surrounds the inner half-mould 40a and determines therewith the first cast for making the insert 11.

By moving back the outer movable jaws 40b, 40c, 40d, 40e, 40f, 40g it is possible to extract the insert 11 formed in the first mould 40.

The movement means of the outer movable jaws 40b, 40c, 40d, 40e, 40f, 40g can be considered to be of the known type.

There are for example 6 of such outer movable jaws 40b, 40c, 40d, 40e, 40f, 40g but there may also be a different number of them according to technical requirements and needs.

Such outer movable jaws can be removed from the movement means.

Advantageously, such outer movable jaws 40b, 40c, 40d, 40e, 40f, 40g are the same as each other.

Thanks to a similar first mould 40, to change the ornamental pattern of a vase 10 it is sufficient to replace the outer movable jaws 40b, 40c, 40d, 40e, 40f, 40g with others bearing exposure reliefs of a different shape.

It has in practice been established that the invention achieves the intended task and objects.

Mainly, with the invention a process has been developed that enables clear and well defined ornamental patterns in bas-relief to be made.

In particular, with the invention an apparatus has been developed that allows many different aesthetic variations to be made only by replacing the outer movable jaws of the first mould.

Furthermore, with the invention an object made of plastic material has been developed with the process according to the invention, and in particular an innovative vase made of plastic material has been developed, made with such process and such apparatus according to the invention.

The invention thus conceived is susceptible to several modifications and variations, all falling within the scope of the inventive concept; furthermore, all the details can be replaced by other technically equivalent elements.

In practice, any components and materials can be used according to requirements, as long as they are compatible with the specific use, the dimensions, the contingent shapes and the prior art.

Where the characteristics and techniques mentioned in any claim are followed by reference notes, such reference notes should be intended as having been added for the sole purpose of increasing the intelligibility of the claims and consequently such reference notes have no limiting effect on the interpretation of each element identified by way of example by such reference notes.

The invention claimed is:

1. A process for making an object from plastic material, comprising the following operations:

moulding at least one insert by injecting a first plastic material into a first moulding cast, said first moulding cast being configured so that said at least one insert comprises a base from which exposure reliefs extend, such exposure reliefs being intended to be visible when the object made of plastic material is finished, passage channels extend between said exposure reliefs and are configured to receive a second plastic material in a subsequent overmoulding operation;

positioning said at least one insert in a second moulding cast so that said at least one insert is positioned with said base pressed against a first surface of a first half-mould of said second cast, and with said exposure reliefs pressed against an opposite second surface of a second half-mould of said second cast, said passage channels between said exposure reliefs being freely open;

overmoulding a second plastic material on a part of said at least one insert by injecting said second plastic material into said second cast so that said second plastic material passes through said passage channels between said exposure reliefs of said insert and covers said base being interposed between said exposure reliefs, wherein at least one of said exposure reliefs has a hollow surrounded by a perimeter sealing edge, said perimeter sealing edge being pressed against said opposite second surface of said second half-mould during said overmoulding to prevent entry of said second plastic material into said hollow during said overmoulding.

2. The process according to claim 1, wherein said passage channels are configured so as to allow passage of said second plastic material from a first side to a second opposite side of said at least one insert during the overmoulding.

3. The process according to claim 1, wherein said injecting of said second plastic material into said second cast takes place so that said second plastic material fills said second cast passing through said passage channels defined between said exposure reliefs of said insert, without entering said hollows of said at least one of said exposure reliefs.

4. An apparatus for making a vase, comprising:

a first mould inside which a first cast is defined for making an insert comprising an annular base, exposure reliefs extending from the base, and passage channels defined between the exposure reliefs;

a second mould inside which a second cast is defined for making a hollow body comprising a bottom and a side wall that extends from the bottom, said second mould comprising a first inner half-mould and a second outer half-mould configured to be coupled with said insert so that said insert is positioned with said base pressed against a first surface of said first inner half-mould; and with said exposure reliefs pressed against an opposite second surface of said second half-mould so that said passage channels are freely open; and wherein said first mould defining said first cast for making said insert comprises an inner half-mould and at least three outer movable jaws that are configured to define the base and the exposure reliefs.

5. The apparatus according to claim 4, further comprising a third mould for making a saucer.

6. The apparatus according to claim 5, further comprising two single blocks on each of which three half-moulds of said first mould, second mould, and third mould are defined.

7. The apparatus according to claim 4, further comprising automatic means for extraction of said insert from said first mould and insertion of said insert into said second mould.

* * * * *